United States Patent
Bajuk et al.

(10) Patent No.: US 6,249,776 B1
(45) Date of Patent: Jun. 19, 2001

(54) METHODOLOGY FOR PROPER WEIGHTING OF PHOTOLITHOGRAPHY IN THE COST OF SEMICONDUCTOR PRODUCTS

(75) Inventors: Stanislav P. Bajuk, Austin, TX (US); Cathy L. Blouin, Franklin, VT (US); Gregory A. Blunt, Essex Junction, VT (US); Gary D. Boldman, Jericho, VT (US); Robert C. Juba, Manasas, VA (US); Daniel A. McAuliffe, Burlington, VT (US); Peter J. Miller, Essex Junction, VT (US); Stephanie A. Miraglia, Burlington, VT (US); Thomas C. Richardson, Huntington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,268

(22) Filed: Sep. 22, 1998

(51) Int. Cl.[7] .................................................. G06F 17/60
(52) U.S. Cl. .................................................. 705/400; 705/7
(58) Field of Search ............................... 705/1, 7, 29, 30, 705/400; 707/104

(56) References Cited

U.S. PATENT DOCUMENTS

| | | | |
|---|---|---|---|
| 3,660,649 | * 5/1972 | Gilchrist et al. | 705/400 |
| 4,885,694 | * 12/1989 | Pray et al. | 705/400 |
| 4,887,206 | * 12/1989 | Natarajn | 705/29 |
| 5,249,120 | * 9/1993 | Foley | 705/1 |
| 5,732,401 | * 3/1998 | Conway | 705/29 |
| 5,793,632 | * 8/1998 | Fad et al. | 705/400 |
| 5,804,090 | * 9/1998 | Iwasaki et al. | 216/99 |
| 5,960,417 | * 9/1999 | Pan et al. | 705/400 |
| 5,970,476 | * 10/1999 | Fahey | 705/28 |

FOREIGN PATENT DOCUMENTS 57-21853 * 2/1982 (JP) ..................................... 257/570

OTHER PUBLICATIONS

Cooper: "MMIC production using MBE: present and future. (monolithic microwave integrated circuits)(molecular beam epitaxy)"; Microwave Lournal, Jun. 1990, v33, n6, pp. 105–109.*

Mackey et al: "Decision–focused costing at Kenco"; Management Accounting, May 1993, v74, n11, pp. 22–26.*

* cited by examiner

Primary Examiner—Edward R. Cosimano
(74) Attorney, Agent, or Firm—McGinn & Gibb, PLLC; Richard Kotulak, Esq.

(57) ABSTRACT

A method of, computer system for, and computer program product for causally relating costs to products, including relating costs to a wafer having semiconductor chips comprising identifying resource costs for manufacturing the wafer including identifying equipment costs, computing load factors for each of the resource costs (the computing load factors for the equipment costs comprising determining a number of exposure fields on the wafer, computing a raw processing time for the wafer based on the number of exposure fields, and determining a percentage the raw processing time represents of a manufacturing time period on an equipment element, the equipment element having the equipment costs), producing weighted resource costs based on the resource costs and the load factors, (the producing weighted resource costs for the equipment costs comprising multiplying the equipment costs by the percentage), summing the weighted resource costs for the wafer, determining a volume of the wafer manufactured, and dividing the weighted resource costs by the volume to produce a weighted cost per wafer.

33 Claims, 8 Drawing Sheets

```
        ┌───┐                              ┌───┐
        │ A │                              │ B │
        └───┘                              └───┘
    DEPRECIATION    2000              DEPRECIATION    5000
    MATERIALS       400               MATERIALS       200
    STAFFING        150               STAFFING        150
    OCCY            100               OCCY            100
                  $2,650                            $5,450
```

COMPUTE COST OF EACH OPERATION ON EACH TOOL:

TOOL A    COST = $2650/DAY

| OPER | RPT (MIN/WAF) | #WAFS | TIME (MIN/DAY) | TIME (HRS/DAY) | LOAD FACTOR | APPORTIONED COST | TOOL A COST PER WAFER |
|---|---|---|---|---|---|---|---|
| X | 1 | 200 | 200 | 3.33 | 0.25 | 662.50 | 3.31 |
| Y | 4 | 30 | 120 | 2.00 | 0.15 | 397.50 | 13.25 |
| Z | 2 | 240 | 480 | 8.00 | 0.60 | 1590.00 | 6.63 |
|   |   |   | 800 | 13.33 |   |   |   |

TOOL B    COST = $5450/DAY

| OPER | RPT (MIN/WAF) | #WAFS | TIME (MIN/DAY) | TIME (HRS/DAY) | LOAD FACTOR | APPORTIONED COST | TOOL B COST PER WAFER |
|---|---|---|---|---|---|---|---|
| X | 1 | 300 | 300 | 5.00 | 0.30 | 1635.00 | 5.45 |
| Y | 4 | 125 | 500 | 8.33 | 0.50 | 2725.00 | 21.80 |
| Z | 2 | 100 | 200 | 3.33 | 0.20 | 1090.00 | 10.90 |
|   |   |   | 1000 | 16.66 |   |   |   |

COMPUTE AVERAGE COST OF EACH OPERATION BY ROUTE:

ROUTE 1

| OPER | TOOL | WAFS | LOAD | CPW | AVG CPW |
|---|---|---|---|---|---|
| X | A | 200 | 0.8 | 3.31 | 2.65 |
| X | B | 50 | 0.2 | 5.45 | 1.09 |
|   |   | 250 |   |   | 3.74 |
| Y | A | 30 | 0.55 | 13.25 | 7.29 |
| Y | B | 25 | 0.45 | 21.80 | 9.81 |
|   |   | 55 |   |   | 17.10 |
| Z | A | 240 | 0.96 | 6.63 | 6.36 |
| Z | B | 10 | 0.04 | 10.90 | 0.44 |
|   |   | 250 |   |   | 6.80 |

TOTAL: $27.64

ROUTE 2

| OPER | TOOL | WAFS | LOAD | CPW | AVG CPW |
|---|---|---|---|---|---|
| X | A | 0 | 0.0 | 3.31 | 0.00 |
| X | B | 250 | 1.0 | 5.45 | 5.45 |
|   |   | 250 |   |   | 5.45 |
| Y | A | 0 | 0.0 | 13.25 | 0.00 |
| Y | B | 100 | 1.0 | 21.80 | 21.80 |
|   |   | 100 |   |   | 21.80 |
| Z | A | 0 | 0.0 | 6.63 | 0.00 |
| Z | B | 90 | 1.0 | 10.90 | 10.90 |
|   |   | 90 |   |   | 10.90 |

TOTAL: $38.15

FIG.1D

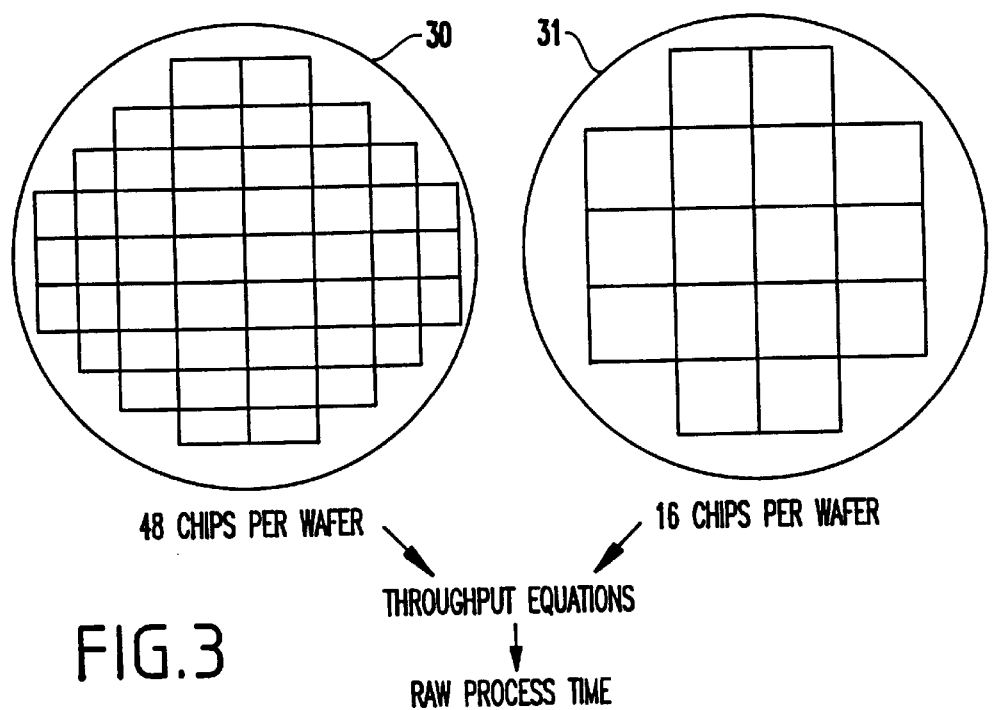

FULL ABSORPTION COST

TOOL COST = $2000 / DAY
NO. OF WAFERS RUN = 100

COST PER WAFER = $20 / WAF

FULL CAPACITY COST

TOOL COST = $2000 / DAY
NO. OF WAFERS THAT COULD BE RUN IF TOOL WAS RUNNING AT TARGET CAPACITY = 1152

COST PER WAFER = $1.74 / WAF $$\text{FC COST} = \text{FA COST} \times \frac{\text{ACTUAL PRODUCTION HOURS}}{\text{TARGET PRODUCTION HOURS}} = 20 \times \frac{100}{1152} = \$1.74$$

FIG. 4

METHODOLOGY FOR PROPER WEIGHTING OF PHOTOLITHOGRAPHY IN THE COST OF SEMICONDUCTOR PRODUCTS

BACKGROUND OF THE INVENTION

1. Field of the Invention

The present invention generally relates to methods for allocating cost and more particularly to a causal methodology for costing product processing.

2. Description of the Related Art

The spiraling cost of semiconductor production has driven the industry to pursue greater economies of scale. This trend has forced a move from smaller, single partnumber fabricators to bigger, multiple partnumber, multiple technology fabricators. Costing is easy in a single partnumber fabricator and involves simply dividing total spending by the total units produced. Difficulties arise in costing wafer processing not as a result of complex processing or advanced tooling requirements, but rather as a result of diverse and extensive product offerings. Multiple partnumber, multiple technology fabricators must develop methodologies for costing different products. Traditional accounting systems track cost by department, not by partnumber, so developing a methodology which accurately assigns cost by partnumber becomes a key concern. Conventional cost-of-ownership models provide detailed cost data of equipment assets but not wafer processing costs. What is needed is a cost model that goes beyond classical cost-of-ownership data to provide accurate processing costs for such items as semiconductor wafers.

SUMMARY OF THE INVENTION

It is, therefore, an object of the present invention to provide a structure and method for a wafer processing cost model. The inventive cost-of-processing model provides wafer processing cost data from raw wafer through final passivation and parametric testing. This new model goes beyond conventional cost-of-ownership data and captures more than just equipment costs because process, product, and fabricator costs are also captured. These costs are then causally spread to wafers via various methodologies. In order to do this, some historical cost problems had to be addressed, such as how to properly weight equipment usage and account for dedicated equipment requirements, deal with measurement sampling, incorporate idle time and contingency, and account for different photolithographic field sizes. Output from the model was fully validated against actual spending and tied to accounting data in order to assure a full dollar capture.

More specifically, one embodiment of the invention comprises a method of, computer system for, and computer program product for causally relating costs to products. The invention includes relating costs to a wafer having semiconductor chips comprising identifying resource costs for manufacturing the wafer including identifying equipment costs, computing load factors for each of the resource costs (the computing load factors for the equipment costs comprising determining a number of exposure fields on the wafer, computing a raw processing time for the wafer based on the number of exposure fields, and determining a percentage the raw processing time represents of a manufacturing time period on an equipment element, the equipment element having the equipment costs), producing weighted resource costs based on the resource costs and the load factors, (the producing weighted resource costs for the equipment costs comprising multiplying the equipment costs by the percentage), summing the weighted resource costs for the wafer, determining a volume of the wafer manufactured, and dividing the weighted resource costs by the volume to produce a weighted cost per wafer.

The process of identifying resource costs further comprises identifying partnumber costs, identifying technology costs and identifying factory costs.

Similarly, the process of identifying equipment costs comprises assigning costs of one or more of depreciation, spare parts, operator staffing, maintenance support, and vendor service contracts to the equipment element, and rolling up costs of related peripheral equipment to the equipment element. Also, the process of computing load factors for the equipment costs further comprises allocating indirect equipment costs, including at least one of power, deionized water, bulk chemical usage, air filtration, air purification, hoods, transfer equipment, air showers, minienvironments, gas-isolation boxes and other peripheral equipment to the equipment element. The process of computing load factors for the partnumber costs comprises allocating a portion of costs of one or more of yield analysis, systems setup, mask-set qualification, process tailoring, raw materials and engineering activities to the wafer based on an age of the wafer.

The process of computing load factors for the technology costs comprises allocating a portion of costs of one or more of process qualification, routing creation, recipe creation, process window definition, design of process controls and yield planning to the wafer based on an age of the wafer. Similarly, the process of computing load factors for the factory costs comprises allocating a portion of costs of one or more of administrative services, data processing, garment rooms, break areas and systems support to said wafer.

The process of identifying resource costs includes determining optional process costs, and the computing load factors includes computing load factors for at least one optional process based on a volume of the wafers subjected to the optional process.

The process of determining a volume of the wafer manufactured comprises substituting a predetermined full capacity volume for the volume of the wafer manufactured. Further, the process of determining a volume of the wafer manufactured comprises subtracting an amount of rework and scrap from the volume of the wafer manufactured. Also, the process of further comprising verifying the weighted cost per wafer.

BRIEF DESCRIPTION OF THE DRAWINGS

The foregoing and other objects, aspects and advantages will be better understood from the following detailed description of preferred embodiments of the invention with reference to the drawings, in which:

FIG. 1D illustrates a numerical example of the invention applied to different tools and different tool groups;

FIGS. 2A–2B illustrate numerical examples of the invention applied to different operations;

FIG. 3 is a schematic diagram of different density wafers;

FIG. 4 is a numerical example of full absorption cost and full capacity costs according to the invention;

DETAILED DESCRIPTION OF PREFERRED EMBODIMENTS OF THE INVENTION

Figure 1A:
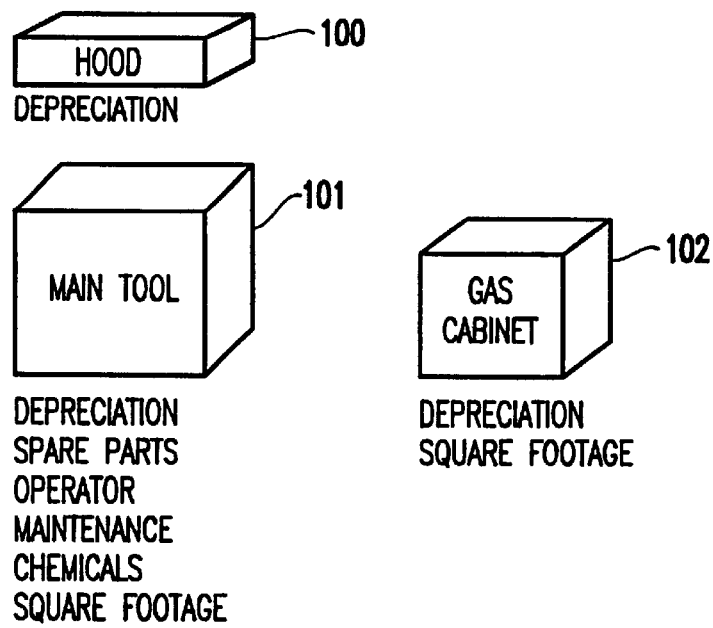
FIGS. 1A–1C illustrate examples of tool entity components, shared entity components and clustered tool entities.

The invention models wafer processing cost from raw wafer through final passivation and parametric testing. It also captures more than just equipment costs, focusing as well on the product, technology, and fabricator costs associated with producing multiple partnumber and multiple technology devices. These costs are then causally assigned to wafers using various methodologies.

To do this, a number of historical cost problems are addressed, such as how to properly weight equipment usage and account for dedicated equipment requirements, deal with measurement sampling, incorporate idle time and contingency, and account for different photolithographic field sizes. Output from the model is fully validated against actual spending and tied to accounting data in order to assure a full dollar capture.

More specifically, with the invention, semiconductor manufacturing costs are broadly divided into four categories—equipment, partnumber, technology, and factory-related expenses. Each of these cost "components" contributes to the overall cost of the finished wafer.

The invention will be described with respect to semiconductor wafer manufacturing. However, the invention is not limited to semiconductor wafer manufacturing and is equally applicable to any form a manufacturing or costing process or model.

Semiconductor wafers are processed through highly specialized state-of-the-art tools (e.g., "equipment") with costs shared by each wafer being processed. Cost is also accrued by wafers from "partnumber"-related activities such as yield analysis, systems setup, mask-set qualification, and process tailoring. In addition, each wafer is manufactured using a specific processing "technology". Engineering activities associated with introducing and supporting each technology include process qualification, routing and recipe creation, process window definition, design of process controls, and yield planning. Finally, there are the factory overhead costs (e.g., "factory-related expenses") that are shared by all wafers being run in the fabricator such as administrative services, data processing, garment rooms, break areas, and systems support.

To properly assign cost to semiconductor wafers, each of the four components—equipment, partnumber, technology, and fabricator expenses—must be identified, weighted and assigned to the wafers. These components are discussed in greater detail below.

Equipment Costs

Two requirements must be met to accurately weight and assign equipment costs to wafers. First, the equipment costs, themselves, must be accurate. Second, there must be a methodology for assigning the cost of the equipment to the wafers.

To meet the first requirement, costs are matched to the equipment. Depreciation, spare parts, operator staffing, maintenance support, and vendor service contracts are matched precisely to specific pieces of equipment.

When it is difficult to know which costs were incurred by which tools, the invention uses an allocation methodology for assigning costs to tools. For example, unless power consumption is metered at each tool, it is difficult to know the power consumption for each individual tool. Otherwise, all that is known is the power consumption for the entire factory. The invention includes a methodology which assigns the computed power consumption to each tool.

Examples of such costs that are treated in this way are power, deionized water, bulk chemical usage, and air filtration and purification. After the cost of individual tools is identified, the costs are then collectively rolled up to the tool "entity" level. This means, for example, that the cost of hoods, transfer equipment, air showers, minienvironments, gas-isolation boxes, and other peripheral equipment are summed with their "parent" equipment. Clustered tools are treated in the same fashion.

In "rolling up" or adding together equipment costs, several factors are considered. In the case of peripheral equipment that does not produce wafers (such as the hood 100 and gas cabinet 102 depicted in FIG. 1A) and which can clearly be identified as supporting a single tool 101, all costs are summed.

At the very least this would entail summing the depreciation for each piece of equipment. If the peripheral equipment takes up floor space, (like the gas cabinet 102), it will also have an occupancy charge. Maintenance costs as well are summed (even hoods and gas cabinets may at times require servicing) as well as all other spare parts or associated costs.

Figure 1B:
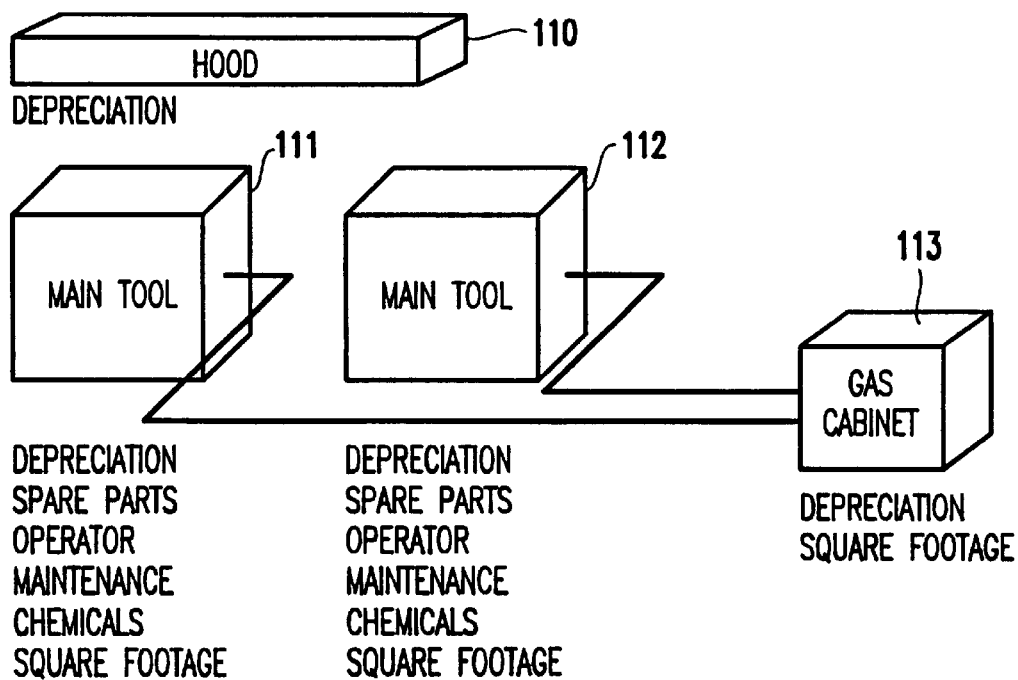

In the case of "shard" peripheral equipment (see FIG. 1B), the cost of shared equipment (e.g., hood 110, gas cabinet 113) is divided equally between all main tools 111, 112 that are supported.

Figure 1C:
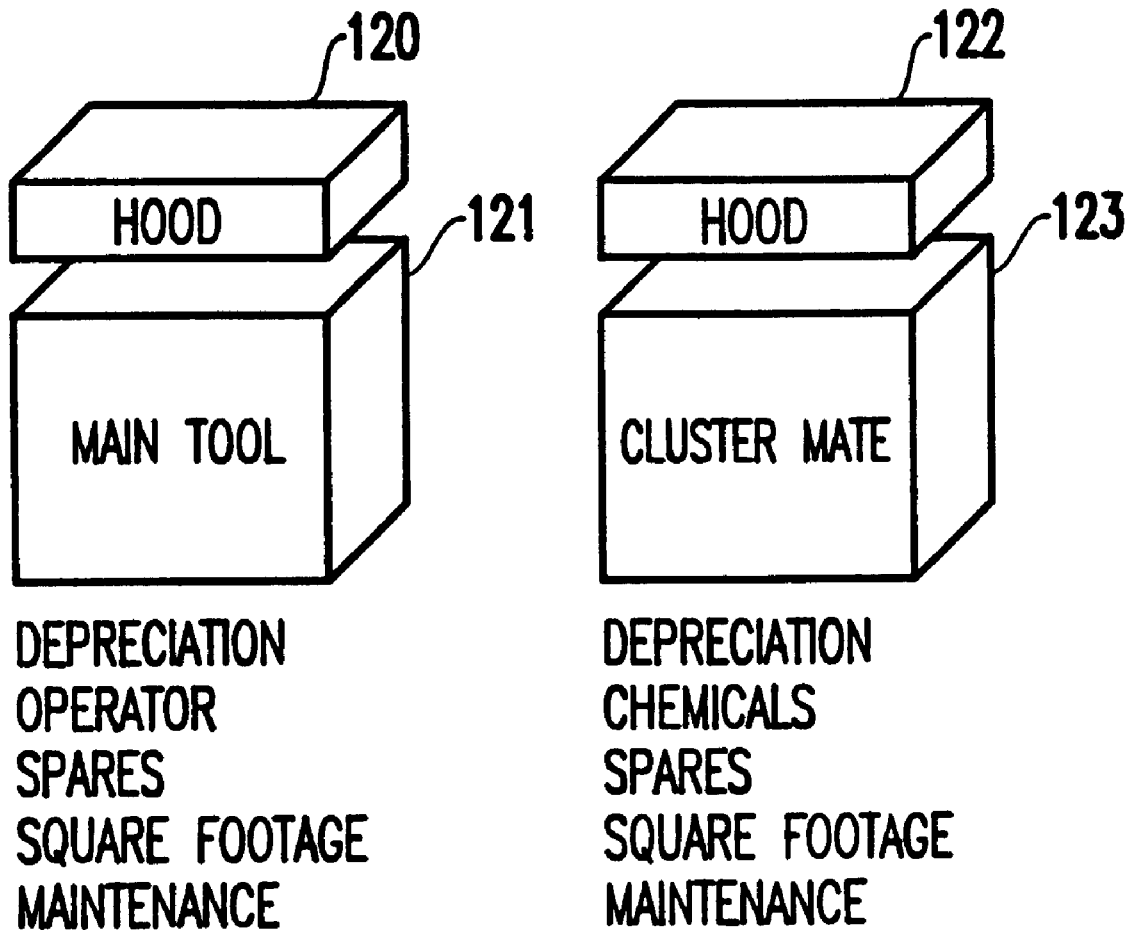

Clustered equipment is handled in a similar fashion, even though clustered equipment differs from peripheral equipment in several ways. Clustered equipment (see FIG. 1C) typically comprises at least two main wafer-producing tools 121, 123 that are linked together. An example of this would be an apply tool linked to an expose tool. Both may have peripheral equipment (e.g., hoods 120, 121) as well. Since they are linked, they are treated as a single wafer-producing entity, with all costs incurred by both being added together.

This collection of equipment-related costs alone is valuable. Indeed, costs can be derived from the conventional cost-of-ownership data is essential to understanding the cost of equipment assets. The inventive cost-of-processing model takes cost-of-ownership data one step further by causally relating the cost of the equipment to the wafers run on the equipment. This is accomplished using both raw process time, exposure time (for chip based methodology) and wafer volume as weighting factors.

Referring now to FIG. 1D, a "load factor" is computed using both the raw process time and number of wafers of each operation being run on each tool in the fabricator. Weighting is performed again at the operational level to identify the single cost of each operation. Once all costs have been assigned to operations with load factors, operational costs are then added together to compute a total processing cost for each type of wafer being manufactured.

More specifically, FIG. 1D illustrates two different tools, tool A and tool B. The costs, including depreciation, materials, staffing and other facilities overhead (e.g., lights, power, water) for each of the tools is as shown in FIG. 1D. Specifically, tool A has a total daily cost of $2,650 and tool B has a daily cost of $5,450.

Three exemplary operations (operation x, operation y and operation z) are illustrated for each of the tools A and B. A cost per wafer for each of the tools is calculated as follows. The number of minutes required to process a wafer is multiplied by the number of wafers processed in a given day to determine the minutes and hours per day the tool will perform the different operations x, y and z. A load factor is formulated according to the percentage of time each operation uses of the tool's total daily operation time. For example, operation x requires 200 minutes of a total 800 minute operating day, which results in a load factor of 0.25 for operation x on tool A.

The load factor is multiplied by the daily cost of the tool to produce an apportioned cost for each of the given operations on each of the tools. Therefore, operation x on tool A would have an apportioned cost of 0.25 times $2,650 equaling $662.50. The apportioned cost is then divided by the number of wafers processed in a given operation in a given day to produce a tool-specific, operational cost per wafer. Therefore, in the example of tool A shown in FIG. 1D, the apportioned cost of operation x of $662.50 would be divided by 200 wafers, which would result in a cost for wafer of $3.31. A similar calculation is performed for the remaining operations and on tool A all operations on tool B, as illustrated in FIG. 1D.

The average cost of different routes (e.g., route 1 and route 2) is then calculated as shown at the bottom of FIG. 1D. The different routes illustrated in FIG. 1D utilize tool A and tool B differently to produce different loads. Because of the different daily cost of tools A and B, the different loading of tools A and B produces different average costs per wafer. For example, with respect to operation x in route 1, tool A is used for 200 wafers and tool B is used for 50 wafers, which results in a 0.8 load on tool A and 0.2 load on tool B.

The various loads are multiplied by the above-calculated cost per wafer to weight the cost per wafer for a given operation at a given tool. For example in operation x, the load of 0.8 is multiplied by the cost per wafer of $3.31 which results in an average cost per wafer of $2.65. The weighted costs per wafer for each tool are then added to determine the route-specific average cost per wafer of each operation.

This process is repeated for each operation within route 1, so that a total average cost per wafer may be computed. Similar calculations are made for route 2. Note that in this example, route 2 utilizes only the more expensive tool B and, thus, has a total average cost per wafer which is higher than route 1.

Partnumber & Technology Costs

Partnumber costs are specific costs associated with individual partnumbers. These include, for example, a raw wafer, a photolithographic mask set, and engineering activities required to introduce the partnumber to production, characterize parametric features, and analyze yield. Once partnumber-related costs have been assessed, they are assigned to wafers based on the age of the particular partnumber (how long it has been running in the fabricator). With this methodology, newer partnumbers are accorded a larger share of engineering dollars and costed higher than older partnumbers. For example, if the total cost of engineering supporting existing partnumbers is $500 and nine partnumbers are being produced, one of which is new and eight of which are existing, and a weight of 2:1 could be selected for weighting new partnumbers to existing, then each of the existing partnumbers would be assigned $50 engineering cost while the new partnumber would be assigned $100.

Technology costs are handled in a similar fashion. These costs include the engineering activities required to develop and qualify the process as a whole, establish processing controls, and conduct yield-learning analysis. Once assessed, these costs are assigned to wafers based both on the age of the technology and its volume in the line. Consequently, newer technologies, especially those being ramped up for production, are accorded a larger share of the engineering cost. Similarly, if the total cost of engineering supporting technologies is $1000 and seven technologies are being produced, one of which is new and six of which are existing, and a weight of 4:1 is chosen for weighting new technologies to existing, then each of the existing technologies would be assigned $100 engineering cost while the new technology would be assigned $400.

Factory Costs

All costs not associated with equipment, partnumbers, or technologies are considered to be factory overhead; that is, they are a necessary part of running the factory as a whole and all wafers that run in the factory must share in these costs. Examples of factory overhead are costs associated with garment rooms and break areas, instrument services, information systems, administrative services, and data processing.

Also part of factory overhead are those costs that, while causal, either lack enough data or are too data-intensive to warrant implementation of cost-assignment methodologies. Examples are costs associated with procurement and installation services, mask-house operation, and product reliability activities.

Once collected, all factory overhead costs are shared equally by all wafers processed in the factory. This equal sharing is based roughly on the amount of time each wafer spends in the fabricator. Wafers that have more process steps (and require more of the overall fabricator's resources to produce) are accordingly assigned a larger share of overhead cost.

Over time, and as better data sources become available, factory costs are preferably converted to equipment, product, or technology costs, and more causally assigned to products.

Figure 6:
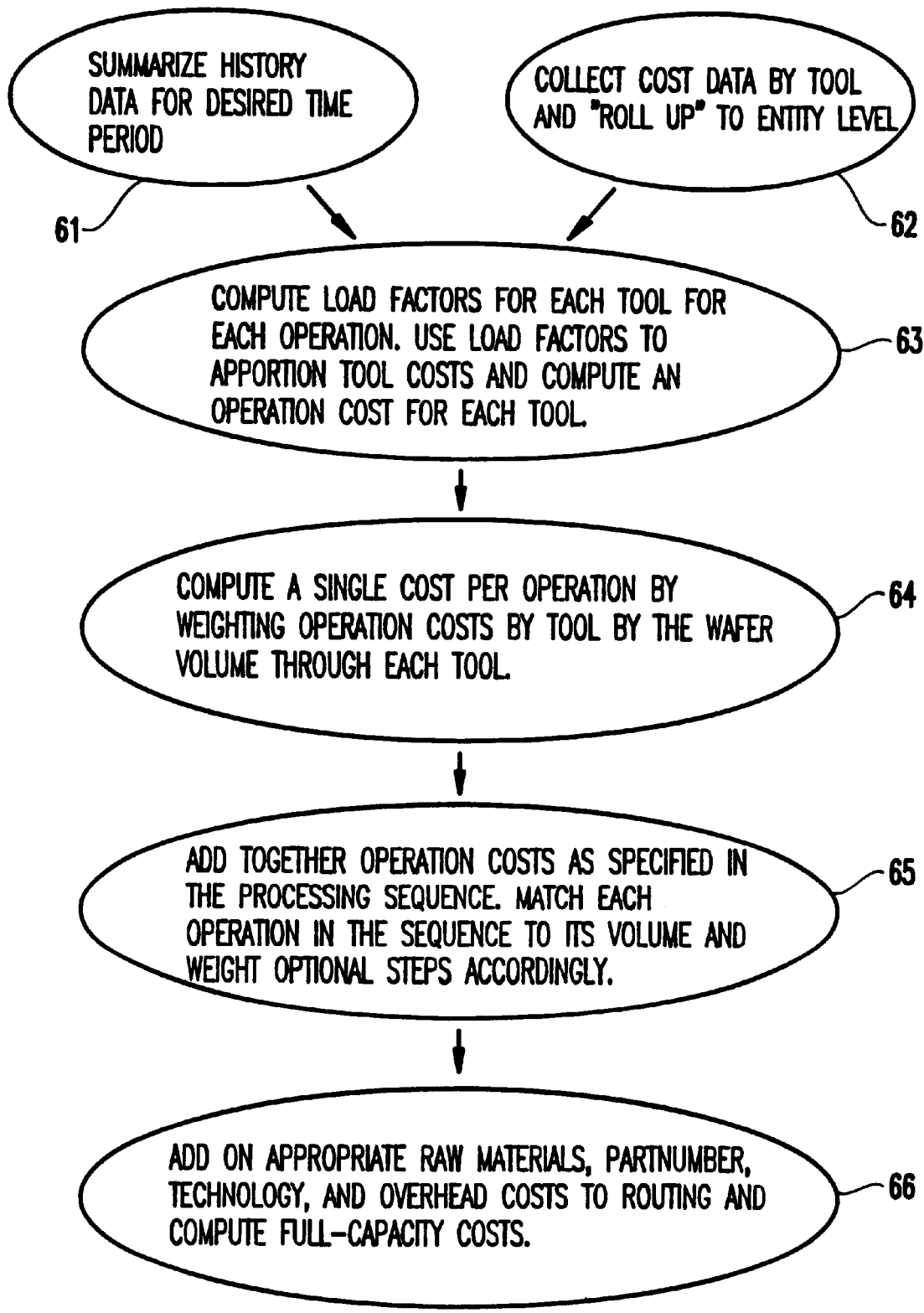
FIG. 6 is a block diagram illustrating one embodiment of the inventive method.

Referring now to FIG. 6, the above-described embodiment of the inventive method is illustrated. More specifically, FIG. 6 illustrates, in item 61, the summarizing of the history data (such as equipment cost, partnumber cost, technology cost, factory cost, etc.) for a desired time period. In item 62 the cost data by tool is collected and rolled up to the entity level, as discussed above with respect to FIGS. 1A–1C.

In item 63 the load factors for each piece of history data is computed, as shown for equipment costs in FIG. 1D. The load factors are used to apportion the history data costs between the various products being manufactured in the factory.

In item 64, the single cost per operation is computed by weighting history costs of each different operation performed using the load factors. For example, the load factors are used to weight the equipment costs to produce a single product cost per operation performed by the different tools by volume through each tool, as discussed above with respect to FIG. 1D.

In item 65 the weighted operation costs for each product are added together. Each operation in the sequence is matched to its volume and optional steps are weighted accordingly, as discussed in more detail below. In item 66 appropriate raw material, part number, technology and overhead costs are added to routing and the full capacity costs are computed, as is also discussed below.

Figure 7:
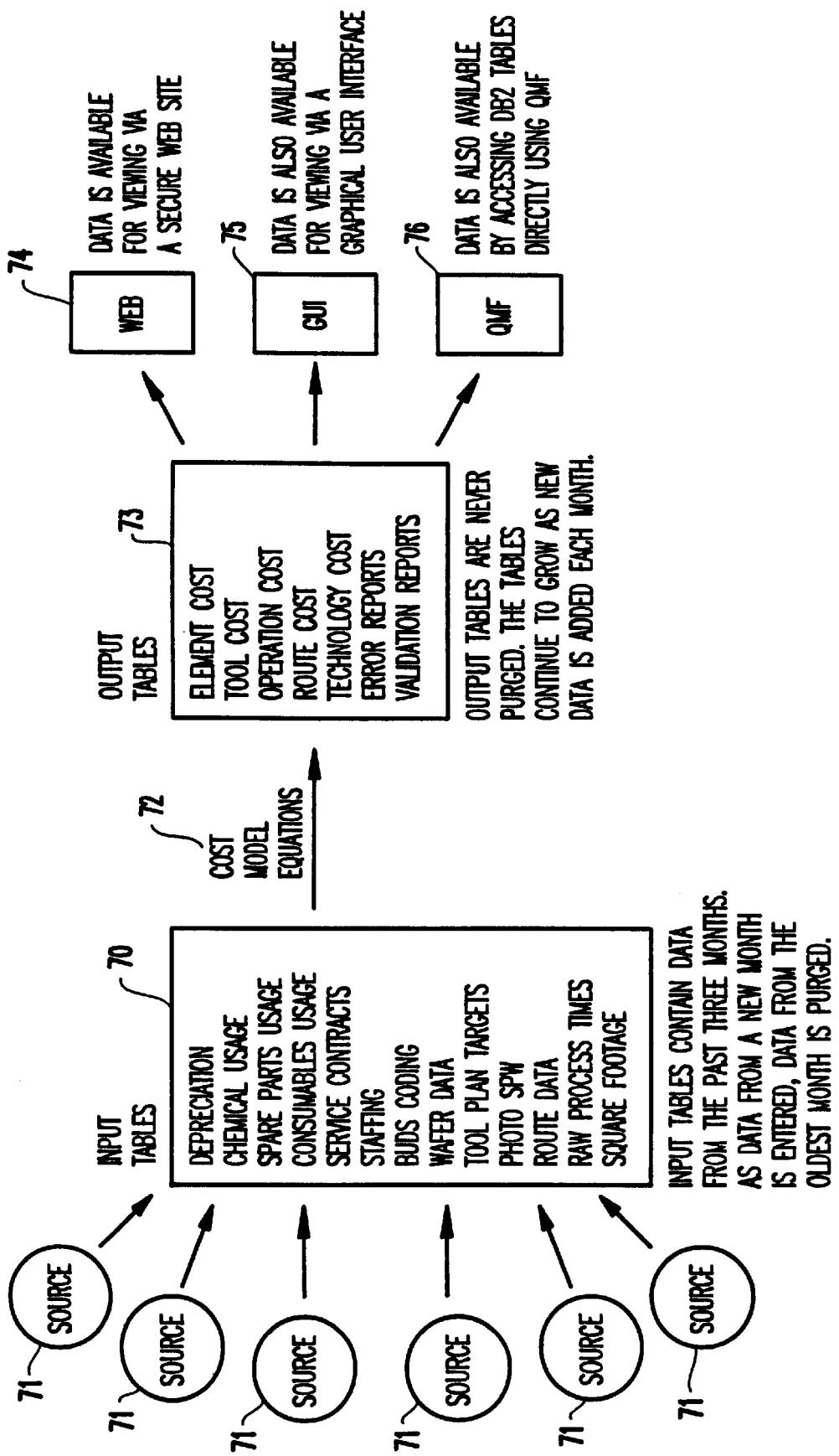
FIG. 7 is a block diagram showing an overview of the invention.

Referring now to FIG. 7, an overview of the inventive process is illustrated. More specifically, an input table 70 is illustrated that receives input from sources 71. The sources 71 input data such as depreciation, chemical usage, spare parts usage, consumables usage, service contracts, staffing, BUDS coding, wafer data, tool plan targets, photo SPW, route data, raw process times and square footage for the previous three months. As data from a new month is entered, data from the oldest of the month is purged.

The cost model equations 72, which are discussed above with respect to FIG. 6, are applied to the data in the input tables 70. The cost model equations 72 output data to an output table 73. More specifically, output table 73 includes element cost, tool cost, operation cost, route cost, technology cost, error reports and validation reports. The output tables 73 are preferably never purged so that the output tables 73 continue to grow as new data is added each month The data is output from the output table 73 to various sources such as the World Wide Web 74, a graphical user interface (GUI) 75 and to a database such as DB2 directly using, for example, structured query language (SQL) 76.

Therefore, the invention identifies the resource costs that are involved in the manufacturing of a product. The invention classifies these resource costs as equipment costs, part number costs, technology costs and factory costs.

Then, the invention computes load factors for each of the resource costs which logically match the cost to the product being manufactured. The load factors are utilized to weight the resource costs appropriately to each of the products manufactured. Once the weighted resource costs for specific products are known, they are divided by the volume of the product manufactured to produce a weighted cost per product.

Measurement and Sampling

A second aspect of the invention is directed to accounting for measurement and sampling operations in determining the cost-of-processing. Semiconductor products are manufactured by performing a specific set of processing operations in a specific order. Most operations in the sequence are vital to the proper operation of the semiconductor device. Other operations, such as measurement, inspection, and testing, do not add intrinsic value to the wafer but are a necessary part of processing in order to assure that processing, as a whole, is performed correctly. These "optional" operations are not always performed on each wafer, certain wafers are chosen to be representative of the total wafer population and are the only ones measured (inspected or tested).

Thus, a typical processing sequence will include a certain number of processing steps, some of which may be optional. Simply summing the cost of all operations in the sequence, without properly weighting the operations where sampling occurs, would overstate the cost of the average wafer through the sequence because not every wafer is sampled.

More specifically, problems occur when historical data shows wafers logged through operations where sampling was performed, even though in reality only a fraction of the wafers were actually sampled. In this case, it is difficult to determine how many wafers were sampled or what raw process time should be assigned to the lot.

The invention incorporates a methodology that properly weights each optional operation in the processing sequence depending upon how frequently, on average, the optional operation is performed. The invention does this by identifying the cost of the optional operations and weighting them by wafer volume flowing through each optional process over the total volume which flowed through the manufacturing process sequence.

There are two types of optional steps. The first type of optional step is built into a sequence in order to give a choice regarding which specific processing a wafer will receive. These steps are built into the processing sequence to allow on-the-fly processing adjustments for a variety of reasons (i.e., device tailoring, yield analysis, parametric adjustment). The second type of optional step is a sampling step. This type of step is usually a measurement or inspection step, that will not be performed on every wafer through the sequence but only on a sample of wafers in order to draw statistical conclusions about the entire population. Thus, the invention properly allocates the costs of optional processing steps and results in more accurate costing of the entire semiconductor processing sequence.

Examples of improper and proper cost allocation of optional processes is illustrated in FIGS. 2A and 2B. More specifically, in FIG. 2A five operations (specifically, an apply step valued at $2.00, two expose steps valued at $5.00 each, a develop step valued at $1.00, and a measurement step valued at $1.00) added together for a total cost per wafer of $14.00. In reality, however, some of these steps are optional. Wafers being processed through this sequence will go through either one or the other of the expose steps, and only one out of every 100 wafers will go through the measurement step. The optional nature of these steps is apparent only upon viewing the wafer volumes through each of the processing steps (100 wafers through apply, 50 through each of the expose steps, 100 through develop, and only 1 wafer through the measurement step) shown in FIG. 2B. Using wafer volume, the cost of each process step can be properly weighted, and a total cost per wafer of $8.01 is computed by summing the cost times volume of each process step and dividing by the total number of wafers processed through the sequence (in this case, 100 wafers).

Therefore, the invention also properly allocates the resource costs for an optional processes by determining the optional process costs, computing load factors for the optional process, weighting the optional processes using the load factors and dividing the weighted optional process costs by the volume of the products subjected to the optional process. The weighted per product cost is then added by to the other per product costs to produce a total weighted cost per product.

Exposure Field Size

Another aspect of the invention accounts for differences in exposure field size when determining cost-of-processing and for allocating costs to individual wafers.

The majority of semiconductor operations are run on tools that processes wafers either individually or in batches. In either case, the basic unit of production is the wafer. Photolithographic operations differ from other semiconductor operations because they are performed at the chip level rather than the wafer level. Consequently, the same weighting methodologies used for wafer-based operations do not effectively work with photolithographic operations. Problems arise because exposure field size is variable and many different field sizes may be processed under a single operation.

For instance, if it takes one minute to process a given wafer through a given operation, it will take two minutes to process a wafer with twice as many exposure fields through the same operation. In this case it is difficult to know, looking at the historical data, which operations lasted one minute per wafer and which lasted two minutes. If historical data does not include information about the number of exposure fields (even the number of chips is not useful information since the chips may be exposed in groups, or "matrixed"), the wafers cannot be properly "weighted" in the cost model.

For example, FIG. 3 illustrates a 48-chip wafer 30 and a 16-chip wafer 31. If a throughput methodology for the tools on which these wafers are processed indicates that 1 minute is required to expose each chip on a wafer, the 48-chip wafer will require 48 minutes to process and the 16-chip wafer only 16 minutes, even though they are both receiving the same processing (for example, exposure to 350 millijoules of ultraviolet light).

The invention builds photolithographic throughput methodologies into the above cost-of-processing model to produce the chip based cost of processing model. Throughput methodologies are based on machine type and model and are developed by modeling throughput of the machines using elapsed time analysis, time and motion studies, and wafer and lot timings. The following shows the throughput equations used for exemplary exposure tools. Each of the following equations computes raw-process time in seconds per wafer given exposures per wafer.

Nikon 9-body RPT=1.10*#exp+46.6

Nikon 10-body RPT=0.90*#exp+46.6

Nikon 11-body RPT=0.70*#exp+42.1

Nikon 12-body RPT=0.65*#exp+42.1

Nikon Wide Field RPT=0.95*#exp+34.3

Micrascan II, IIP, and III RPT=0.8374*(#exp)**1.19863

These throughput equations enable raw process times to be computed given the photolithographic equipment type (manufacturer and model) and the number of exposures on the wafer. The number of exposures on each wafer is derived from maximum and minimum field-count data taken directly from wafer-build documentation.

Once raw process time has been computed for each wafer based on the number of exposures it requires, the model substitutes chip-level raw process time data for wafer-level data. This enables proper weighting and cost assignment of photolithographic operations. In other words, as with the previous embodiments of the invention, the resource costs for a wafer production are identified and the load factors are computed for each of the resource costs.

In particular the load factor for the equipment costs are calculated by determining the number of exposure fields on a wafer, which allows the raw processing time for the wafer to be determined, using the above methodologies. The percentage that the raw processing time represents of the daily operating time of the tool is then used as the load factor. Again, as explained above, the load factor is multiplied by the daily tool cost to produce a weighted resource cost. The number of a given type of wafer produced per day is then divided by the weighted cost to result in an individual per wafer costs for the given tool operation.

Therefore, instead of determining cost per wafer, the costs are actually determined per chip using the number of exposure fields. Therefore, the invention accurately matches the equipment costs and other resource costs on a chip level instead of a wafer level.

Idle Time and Contingency

The standard view of the cost-of-processing model is based on the assumption that wafers run on equipment should fully "absorb" the cost of that equipment. Consequently, wafers run on tools with a great deal of idle time (either planned or unplanned) will cost significantly more than those run on tools with higher throughputs, even if the wafers received the very same processing.

When unique processing drives special tooling in the factory that cannot be used for other processing purposes, it seems appropriate to have those wafers absorb the total cost of the equipment regardless of how many or how few wafers are run. It may also be appropriate to assign wafers a higher cost when they run on newer, more expensive tools. On the other hand, it may not be appropriate to assign products without special requirements a higher cost just because the tools on which they were processed did not run more wafers.

Costing methodologies that are historically based make use of actual processing data (comprised of operation and equipment details,) to assign costs to products. Based on this information, total spending flows to products using various weighting methodologies. The problem with this method is that if the fabricator is only partially loaded, the cost data produced by the model applies only to a partially loaded fabricator. As the fabricator fills and product volumes rise, the cost of equipment assets should be applied to more wafers, with the result being a lower cost per wafer.

Many historical costing methodologies based on actual data lack a methodology for predicting what will happen to cost as a partially loaded fabricator becomes fully loaded. Since business decisions based on wafer cost and revenue are dependent on planned volume, the ability to predict cost for any level of loading is critical to the decision-making process. The invention incorporates a methodology for predicting the cost of semiconductor products run in a fabricator at any level of target loading.

In one aspect of the invention, a "full-capacity" methodology uses equipment planning data to establish a predicted wafer volume based on plan targets. A ratio of planned wafer volume to actual wafer volume is used to recompile cost data in order to produce cost numbers based on planned targets. As the name implies, full-capacity costs reflect the cost of wafers run on equipment, assuming that the equipment is running to its targeted capacity.

For example, as shown in FIG. 4, the full absorption cost of a tool is simply the tool cost divided by the number of wafers processed on that tool in a given time, such as a daily time period. The full absorption example shown in FIG. 4 illustrates a tool with a cost of $2000 per day which runs 100 wafers per day resulting in a $20 per wafer cost.

To the contrary, the full capacity cost produces the cost per wafer based on the number of wafers that could be run if the tool was running at target capacity. In the example shown in FIG. 4, the full capacity cost also has a tool having a $2000 cost per day which has a capacity of 1152 wafers. The tool cost is divided by the number of wafer produced which results in a cost per wafer of $1.74.

Because the wafer history for a fabricator shows the actual number of wafers produced each day by each machine (rather than the number of wafers that could have been produced if each machine was running at target capacity), a method is needed for computing full-capacity cost without calculating individual load factors for each machine and operation. The equation at the bottom of FIG. 4 shows that $1.74 full-capacity operation cost can be derived from the full-absorption cost by multiplying it by the ratio of actual production hours (100) to target production hours (1152). This effectively ratios the entire full-absorption cost up or down depending on whether each machine produced more or less than its expected amount.

As such, the full-capacity cost represents a cost that would be achieved if the fabricator were running at target capacity. While it is not an actual cost (if the fabricator ran either more or less wafers than expected), it is an accurate cost. For the example in FIG. 4, while $1.74 would be the average cost per wafer if the tool had been running to target capacity. Since only 100 wafers were run on the tool (whether because the tool was down or inefficiently used), the actual cost per wafer is $20. While such underloading is undesirable in a fabricator, it is also a reality. The added expense of underutilized tools (averaged over the many operations it takes to produce a semiconductor wafer) will not be as extreme as this example suggests. However, in the long run such inefficiencies must be taken into account if the fabricator is to be profitable.

In reality, full-capacity can be defined in a number of ways including: targeted utilization, availability, or any other level of desired "fullness." The capability to analyze several different targets at once is built into the system to facilitate side-by-side cost analysis of different levels of fabricator loading. Using this methodology, costs can be produced with and without planned contingency, which provides valuable insight into the cost of contingency itself.

Full-capacity costs are based on the assumption that each tool in the fabricator is running to its targeted capacity. However, actual full-capacity will rarely be met in a fabricator with pinch-point tool sets (whether those pinch-points have been purposely designed in or not). In a fabricator with these tool sets, full capacity costs will be lower than total spending. Similarly, in a fabricator where tool targets are set low and all equipment consistently runs "over capacity," full-capacity costs will be higher than actual spending.

In summary, both full-absorption and full-capacity measure methodologies provide valuable cost data, while full-absorption costs provide a better absolute or actual cost, full-capacity costs provide a more accurate measure of relative cost and, therefore, are useful for comparative and planning purposes.

Rework and Scrap

Rework data is usually very causal because a specific tool can be identified as the cause of rework. Therefore, the invention subtracts rework data from the wafer history database so that only the good wafers which are processed are reflected. The effect this has on cost is to raise it on tools that are causing rework.

For example, a tool costing $1000 a day to operate produces 1000 wafers a day at $1 per wafer. If, however, only 500 wafers are good (the other 500 are the same wafers being reworked on the tool), then the cost-of-processing model computes the cost of the wafers as $2 per wafer. Subtracting reworked wafers from total wafers processed produces a cost for a good wafer. The drawback, however, is that the cost of all wafers run on the equipment will rise, rather than just the particular partnumbers being reworked. This is not a problem where systemic equipment-related rework is concerned (i.e., all wafers are affected).

However, this method unfairly charges all wafers a higher equipment cost if, indeed, rework is limited to only one particular partnumber or product. The potential for inaccuracy was conventionally considered acceptable in light of the alternative, which is unassigned dollars resulting from not accounting for reworked wafers.

Scrap, unlike rework, is often difficult to assign to a particular operation or piece of equipment. Wafers scrapped "at" a certain operation are more often, in reality, "discovered" at that operation (this is particularly true of measurement, inspection, and test operations). Therefore, the cost-of-processing model does not assign the value of scrap wafers to individual tools. Since scrap wafers are not removed from the wafer history, costs produced by the model are considered to be unyielded in terms of process loss due to scrap.

The cost model assembles a full product cost by summing individual operation costs for a given production period. Individual lots or wafers are not tracked, and it is impossible to provide the cost of any one specific lot that was processed. Operation costs remain stable whether wafers are scrapped or not, another indication that costs are not yielded. Uplifts to account for process yield loss must be applied to cost-of-processing cost output where yielded data is required.

The removal or non-removal of scrap and rework wafer are inconsequential to the overall workings of the model. They are mentioned here only because it is considered important to know, one way or the other, whether the costs produced by a model are "per wafer" or "per good wafer" and whether or not they are yielded. While this invention produces an unyielded cost per good wafer, it could easily be adjusted to provide a cost per wafer (good or bad) or a yielded answer. As such, a clarification of the numbers are produced by accounting for scrap items.

Validation

To assure that all spending is captured and wafer costs tie to actual financial spending data, two forms of data checking are conducted each time the inventive model is run. First, dollars captured by the model are totaled and checked against spending data as reported by the Finance organization. The model also checks for sources of cost "leakage" (dollars captured by the model but not flowed to the product). Examples of cost leakage are costs associated with tools that run no wafers, or costs associated with operations that are not a part of wafer fabrication.

These dollars are assessed and then "reflowed" in the model to insure that all dollars are ultimately captured. As part of this analysis, individual cost elements (i.e., depreciation, salaries, chemicals) are checked against actual spending to insure that they match. Not only are individual cost elements checked, wafer counts are checked as well.

Performing this type of analysis every time the model is run insures that, over time, the model maintains a consistent level of accuracy and that causality is also being maintained. Finally, cost times volume (c)×Q) analyses of finished wafer costs are conducted to verify that all dollars are being captured and flowed to product wafers.

The classical cost-of-ownership part of the data is used by equipment engineering to understand the cost of equipment over its lifetime, make equipment purchasing decisions, and identify cost-efficient production practices and "problem" tools. Process engineers use the information to compare operation costs in order to evaluate processing alternatives and focus work on improving the most costly parts of processing.

Development engineers use the information to predict the cost of future processes and product features. The information is used by management to make decisions regarding which products are the most profitable to manufacture. Finally, the information is used by Finance to help establish cost standards which are used to assign planned spending dollars to products in accordance with accounting guidelines.

Indeed, it seems the potential uses for good cost data are limitless. A key feature of the invention is that it not only establishes good causality, but also validates and ensures full dollar capture. The inventive cost-of-processing model is a novel extension of classical cost-of-ownership data. Together both sets of data can provide valuable cost data to virtually all organizations involved in any form of production.

While the invention has been described with respect to an exemplary wafer processing environment, and has been described in the form of a manual process, it is equally applicable to all processing environments and all types of production lines. For example, the invention is equally applicable in a traditional mechanical factory setting or a non-traditional production process. Further, the invention includes a computer system, a computer program and a storage medium containing the computer program for performing the above-described process.

Figure 5:
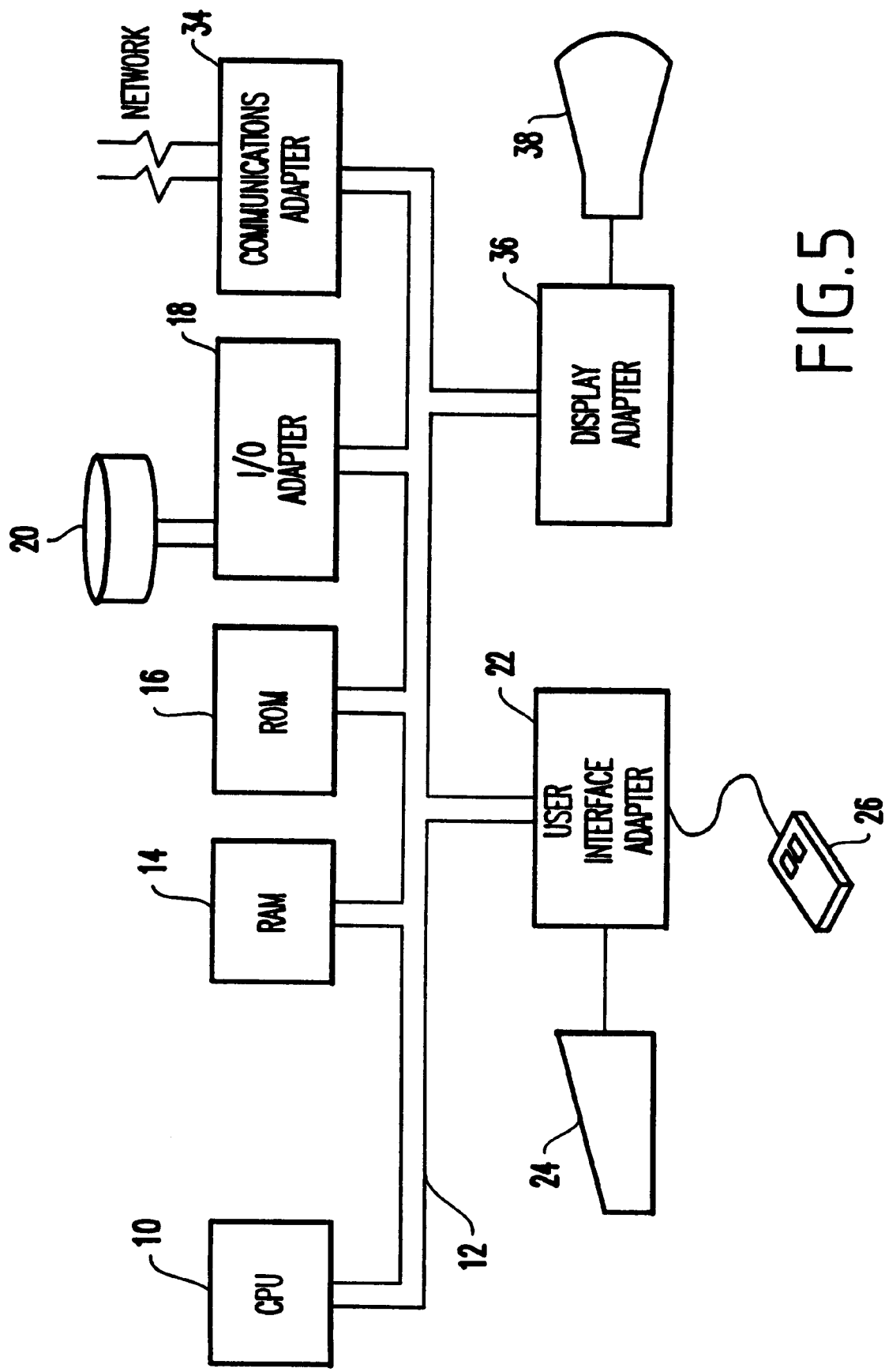
FIG. 5 is a schematic diagram of a computer systems used to implement the invention.

A representative hardware environment for practicing the present invention is depicted in FIG. 5, which illustrates the typical hardware configuration of an information handling/computer system in accordance with the subject invention having at least one processor or central processing unit (CPU) 10. The CPU 10 is interconnected via a system bus 12 to a random access memory (RAM) 14, read-only memory (ROM) 16, input/output (I/O) adapter 18 (for connecting peripheral devices such as disk units 20 to the bus 12), user interface adapter 22 (for connecting a keyboard 24, mouse 26, and/or other user interface device to the bus 12), communication adapter 34 (for connecting an information handling system to a data processing network), and display adapter 36 (for connecting the bus 12 to a display device 38).

While the invention has been described in terms of preferred embodiments, those skilled in the art will recognize that the invention can be practiced with modification within the spirit and scope of the appended claims.

What is claimed is:

1. A method of causally relating costs to a wafer having semiconductor chips, said method comprising:

identifying resource costs for manufacturing said wafer including identifying equipment costs;

computing load factors for each of said resource costs, said computing load factors for said equipment costs comprising determining a number of exposure fields on said wafer, computing a raw processing time for said wafer based on said number of exposure fields, and determining a percentage said raw processing time represents of a manufacturing time period on an equipment element, said equipment element having said equipment costs;

producing weighted resource costs based on said resource costs and said load factors, said producing weighted resource costs for said equipment costs comprising multiplying said equipment costs by said percentage;

summing said weighted resource costs for said wafer;

determining a volume of said wafer manufactured; and dividing said weighted resource costs by said volume to produce a weighted cost per wafer.

2. The method in claim 1, wherein said identifying equipment costs comprises:

assigning costs of one or more of depreciation, spare parts, operator staffing, maintenance support, and vendor service contracts to said equipment element; and rolling up costs of related peripheral equipment to said equipment element.

3. The method in claim 1, wherein computing load factors for said equipment costs further comprises allocating indirect equipment costs, including at least one of power, deionized water, bulk chemical usage, air filtration, air purification, hoods, transfer equipment, air showers, minienvironments, gas-isolation boxes and other peripheral equipment to said equipment element.

4. The method in claim 1, wherein:

said identifying resource costs includes determining optional process costs; and said computing load factors includes computing load factors for at least one optional process based on a volume of said wafers subjected to said optional process.

5. The method in claim 1, wherein said determining a volume of said wafer manufactured comprises substituting a predetermined full capacity volume for said volume of said wafer manufactured.

6. The method in claim 1, wherein said determining a volume of said wafer manufactured comprises subtracting an amount of rework and scrap from said volume of said wafer manufactured.

7. The method as an claim 1, further comprising verifying said weighted cost per wafer.

8. The method in claim 1, wherein said identifying resource costs further comprises:

identifying partnumber costs;

identifying technology costs; and identifying factory costs.

9. The method in claim 8, wherein said computing load factors for said partnumber costs comprises allocating a portion of costs of one or more of yield analysis, systems setup, mask-set qualification, process tailoring, raw materials and engineering activities to said wafer based on an age of said wafer.

10. The method in claim 8, wherein said computing load factors for said technology costs comprises allocating a portion of costs of one or more of process qualification, routing creation, recipe creation, process window definition, design of process controls and yield planning to said wafer based on an age of said wafer.

11. The method in claim 8, wherein said computing load factors for said factory costs comprises allocating a portion of costs of one or more of administrative services, data processing, garment rooms, break areas and systems support to said wafer.

12. A computer system for causally relating costs to a wafer having semiconductor chips, said method comprising:

a unit for identifying resource costs for manufacturing said wafer including a unit for identifying equipment costs;

a unit for computing load factors for each of said resource costs, said unit for computing load factors for said equipment costs comprising a unit for determining a number of exposure fields on said wafer, a unit for computing a raw processing time for said wafer based on said number of exposure fields, and a unit for determining a percentage said raw processing time represents of a manufacturing time period on an equipment element, said equipment element having said equipment costs;

a unit for producing weighted resource costs based on said resource costs and said load factors, said unit for producing weighted resource costs for said equipment costs comprising a unit for multiplying said equipment costs by said percentage;

a unit for summing said weighted resource costs for said wafer;

a unit for determining a volume of said wafer manufactured; and a unit for dividing said weighted resource costs by said volume to produce a weighted cost per wafer.

13. The computer system in claim 12, wherein said unit for identifying equipment costs comprises:

a unit for assigning costs of one or more of depreciation, spare parts, operator staffing, maintenance support, and vendor service contracts to said equipment element; and a unit for rolling up costs of related peripheral equipment to said equipment element.

14. The computer system in claim 12, wherein said unit for computing load factors for said equipment costs further comprises a unit for allocating indirect equipment costs, including at least one of power, deionized water, bulk chemical usage, air filtration, air purification, hoods, transfer equipment, air showers, minienvironments, gas-isolation boxes and other peripheral equipment to said equipment element.

15. The computer system in claim 12, wherein:

said unit for identifying resource costs includes a unit for determining optional process costs; and said unit for computing load factors includes a unit for computing load factors for at least one optional process based on a volume of said wafers subjected to said optional process.

16. The method in claim 12, wherein said unit for determining a volume of said wafer manufactured comprises a unit for substituting a predetermined full capacity volume for said volume of said wafer manufactured.

17. The computer system in claim 12, wherein said unit for determining a volume of said wafer manufactured comprises a unit for subtracting an amount of rework and scrap from said volume of said wafer manufactured.

18. The computer system as an claim 12, further comprising a unit for verifying said weighted cost per wafer.

19. The computer system in claim 12, wherein said unit for identifying resource costs further comprises:

a unit for identifying partnumber costs;

a unit for identifying technology costs; and a unit for identifying factory costs.

20. The computer system in claim 19, wherein said unit for computing load factors for said partnumber costs comprises a unit for allocating a portion of costs of one or more of yield analysis, systems setup, mask-set qualification, process tailoring, raw materials and engineering activities to said wafer based on an age of said wafer.

21. The computer system in claim 19, wherein said unit for computing load factors for said technology costs comprises a unit for allocating a portion of costs of one or more of process qualification, routing creation, recipe creation, process window definition, design of process controls and yield planning to said wafer based on an age of said wafer.

22. The computer system in claim 19, wherein said unit for computing load factors for said factory costs comprises a unit for allocating a portion of costs of one or more of administrative services, data processing, garment rooms, break areas and systems support to said wafer.

23. A computer program product comprising a program storage device readable by a computer system tangibly embodying a program of instructions executed by said computer system to perform in a process for causally relating costs to a wafer having semiconductor chips, said process comprising:

identifying resource costs for manufacturing said wafer including identifying equipment costs;

computing load factors for each of said resource costs, said computing load factors for said equipment costs comprising determining a number of exposure fields on said wafer, computing a raw processing time for said wafer based on said number of exposure fields, and determining a percentage said raw processing time represents of a manufacturing time period on an equipment element, said equipment element having said equipment costs;

producing weighted resource costs based on said resource costs and said load factors, said producing weighted resource costs for said equipment costs comprising multiplying said equipment costs by said percentage;

summing said weighted resource costs for said wafer;

determining a volume of said wafer manufactured; and dividing said weighted resource costs by said volume to produce a weighted cost per wafer.

24. The computer program product in claim 23, wherein said identifying equipment costs comprises:

assigning costs of one or more of depreciation, spare parts, operator staffing, maintenance support, and vendor service contracts to said equipment element; and rolling up costs of related peripheral equipment to said equipment element.

25. The computer program product in claim 23, wherein computing load factors for said equipment costs further comprises allocating indirect equipment costs, including at least one of power, deionized water, bulk chemical usage, air filtration, air purification, hoods, transfer equipment, air showers, minienvironments, gas-isolation boxes and other peripheral equipment to said equipment element.

26. The computer program product in claim 23, wherein:

said identifying resource costs includes determining optional process costs; and said computing load factors includes computing load factors for at least one optional process based on a volume of said wafers subjected to said optional process.

27. The computer program product in claim 23, wherein said determining a volume of said wafer manufactured comprises substituting a predetermined full capacity volume for said volume of said wafer manufactured.

28. The computer program product in claim 23, wherein said determining a volume of said wafer manufactured comprises subtracting an amount of rework and scrap from said volume of said wafer manufactured.

29. The computer product program as an claim 23, further comprising verifying said weighted cost per wafer.

30. The computer program product in claim 23, wherein said identifying resource costs further comprises:

identifying partnumber costs;

identifying technology costs; and identifying factory costs.

31. The computer program product in claim 30, wherein said computing load factors for said partnumber costs comprises allocating a portion of costs of one or more of yield analysis, systems setup, mask-set qualification, process tailoring, raw materials and engineering activities to said wafer based on an age of said wafer.

32. The computer program product in claim 30, wherein said computing load factors for said technology costs comprises allocating a portion of costs of one or more of process qualification, routing creation, recipe creation, process window definition, design of process controls and yield planning to said wafer based on an age of said wafer.

33. The computer program product in claim 30, wherein said computing load factors for said factory costs comprises allocating a portion of costs of one or more of administrative services, data processing, garment rooms, break areas and systems support to said wafer.

* * * * *